R. C. MATTHEWSON.
Transit Instrument.
No. 21,895. Patented Oct. 26, 1858.
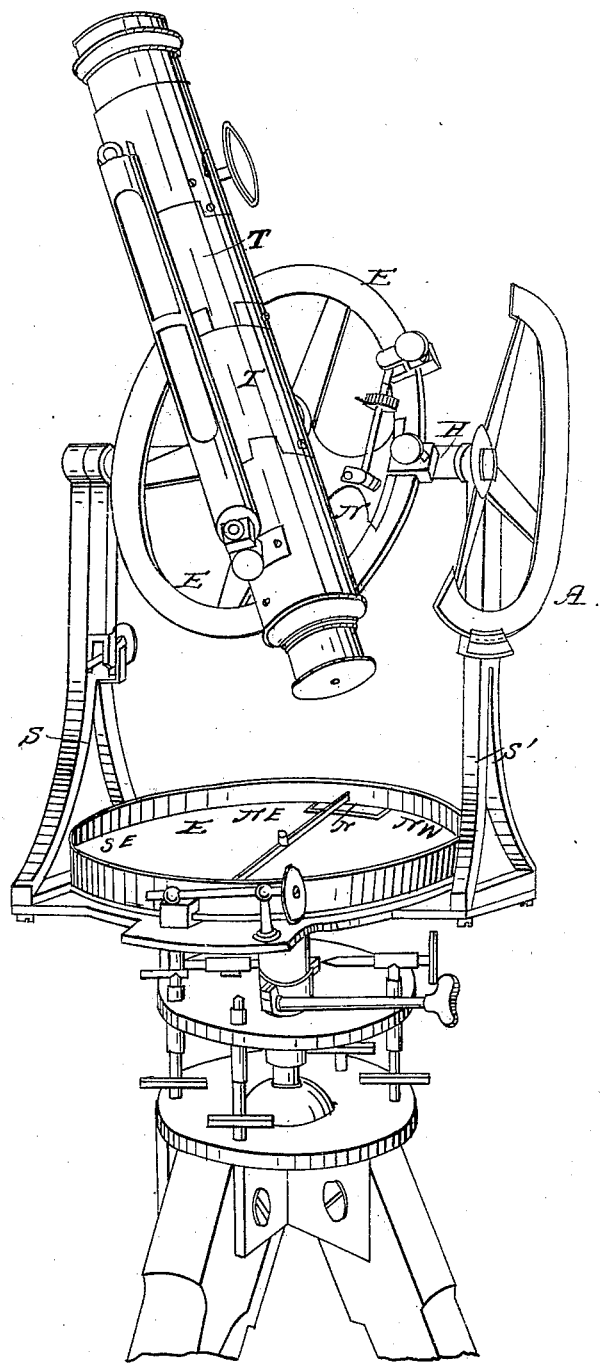

UNITED STATES PATENT OFFICE.

R. C. MATTHEWSON, OF SAN FRANCISCO, CALIFORNIA.

TRANSIT INSTRUMENT.

Specification of Letters Patent No. 21,895, dated October 26, 1858.

*To all whom it may concern:*

Be it known that I, ROBERT C. MATTHEWSON, of the city of San Francisco, county of San Francisco, and State of California, have invented a new, useful, and improved transit for surveying and engineering purposes, by which the longitude as well as the latitude of a place can be ascertained and by which also a true parallel of latitude instead of the arc of a great circle can be run by fore and back sights, as a true meridian is run by the ordinary transit; and I do hereby declare that the following is a full and exact description thereof, showing both its construction and operation, reference being had to the accompanying drawings and to the letters of reference marked on the same.

The compass-box and tripod are constructed in any of the usual forms of the ordinary transit. The standards S,S', the horizontal axis H, and the vertical arc A, with slight changes, the necessity of which must be at once apparent, are also fixed as in the common transit. But instead of attaching the telescope T, permanently to the horizontal axis H, as in the common transit, it is permanently attached to the vertical axis V, which is fixed at right angles in the horizontal axis H, and revolves in it, exactly over the center of the compass-box. Attached to the horizontal axis H, and at right angles to the vertical axis V, is a graduated equatorial circle E, of which the vertical axis V is the center. The telescope T revolves around this equatorial circle E with a vernier N by which the angular motion of the telescope T can be read off from the equatorial circle E.

One advantage of this instrument over the common transit is that oblique angles, as well as horizontal and vertical angles, can be measured. The telescope by this construction can be moved in the plane of any two objects—the moon and a star, for instance—their angular distance ascertained, and consequently the longitude of the place determined. This is done precisely as in the well-known method of "lunars," the only difference being that the angular distance is observed by the transit instead of the sextant. Another advantage of this construction is that by placing the vertical axis parallel to the axis of the earth, the telescope will revolve in the plane of a parallel of latitude, instead of revolving in that of a great circle, as in the case of the ordinary transit, and, of course, a true parallel of latitude can be run by fore and back sights in the same manner as a true meridian is run by the common transit. The foresights and back sights will always be mathematically correct, and any deviations, in consequence of elevations and depressions, can be easily tabulated and the proper allowance made whenever the boundary monuments are to be established.

A solar apparatus has been attached to the telescope by the manufacturer, William Schmolz, by which the declination of the magnetic needle can be ascertained during the day, and it can be ascertained during the night by observing the azimuth of Polaris or any other star of which the polar distance is known. Thus during the day or night the instrument can be placed in the proper position for use by placing the vertical axis in the plane of the meridian and elevating it, by the vertical arc, to the latitude of the place. Hence it appears that, on land, this instrument combines all the advantages of the common transit, Burt's solar compass, and Hadley's sextant, and that with scarcely any increase of bulk or weight and without any complicated machinery. Any person who will take the trouble to study its application and advantages, can with its aid alone ascertain his latitude and longitude, calculate the magnetic variation during the day or night, and run a true parallel of latitude, as well as a true meridian by fore and back sighting.

In performing accurate work, a flag-staff attached to a light tripod with a small telescope and a graduated vertical arc to set the staff in the plane of the parallel of latitude should be used. The construction of this accompanying apparatus is too simple to require any explanation.

The instrument may be made more compact by dispensing altogether with the vertical semi-circle A, and attaching instead a graduated circular arc to the standard, on which the vertical angle can be read by an index, which, for the sake of convenience, may be clamped to or unclamped from the horizontal axis H at pleasure. But as this is no part of the improvement it can be constructed in any of the most approved forms.

What I claim as my invention, and desire to secure by Letters Patent, is—

The manner in which the instrument is constructed so as to ascertain the longitude and run a true parallel of latitude by fore and back sights.

ROBERT C. MATTHEWSON.

Witnesses:
W. BARTLETT,
BENJ. E. BABCOCK.